Aug. 9, 1966　　　I. R. TAYLOR ETAL　　　3,265,853
METHODS OF AND APPARATUS FOR WELDING
Filed April 10, 1963　　　　　　　　　　　7 Sheets-Sheet 7
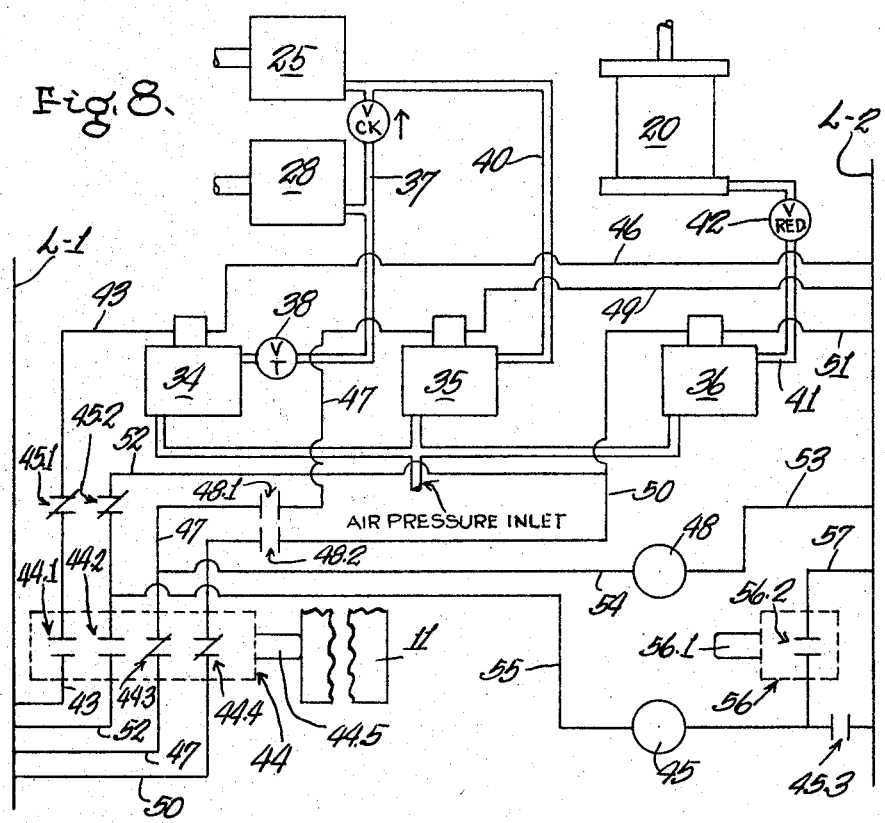
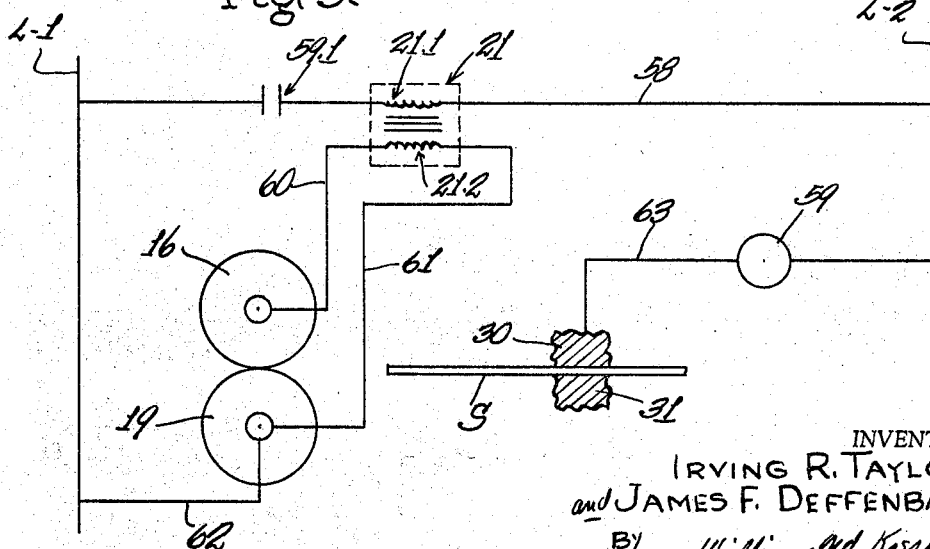
INVENTORS
IRVING R. TAYLOR
and JAMES F. DEFFENBAUGH
BY Williams and Kiseke
ATTORNEYS

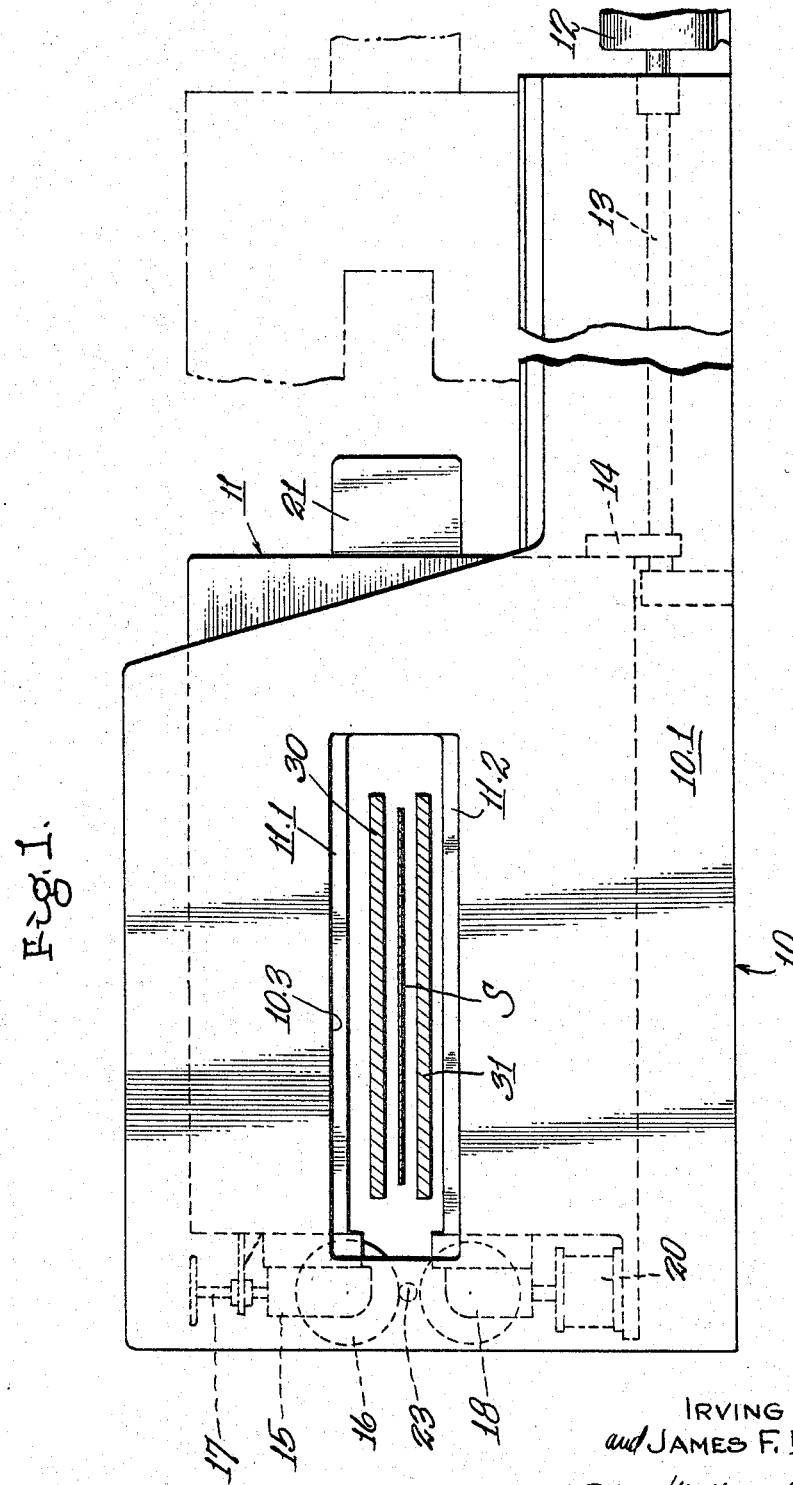

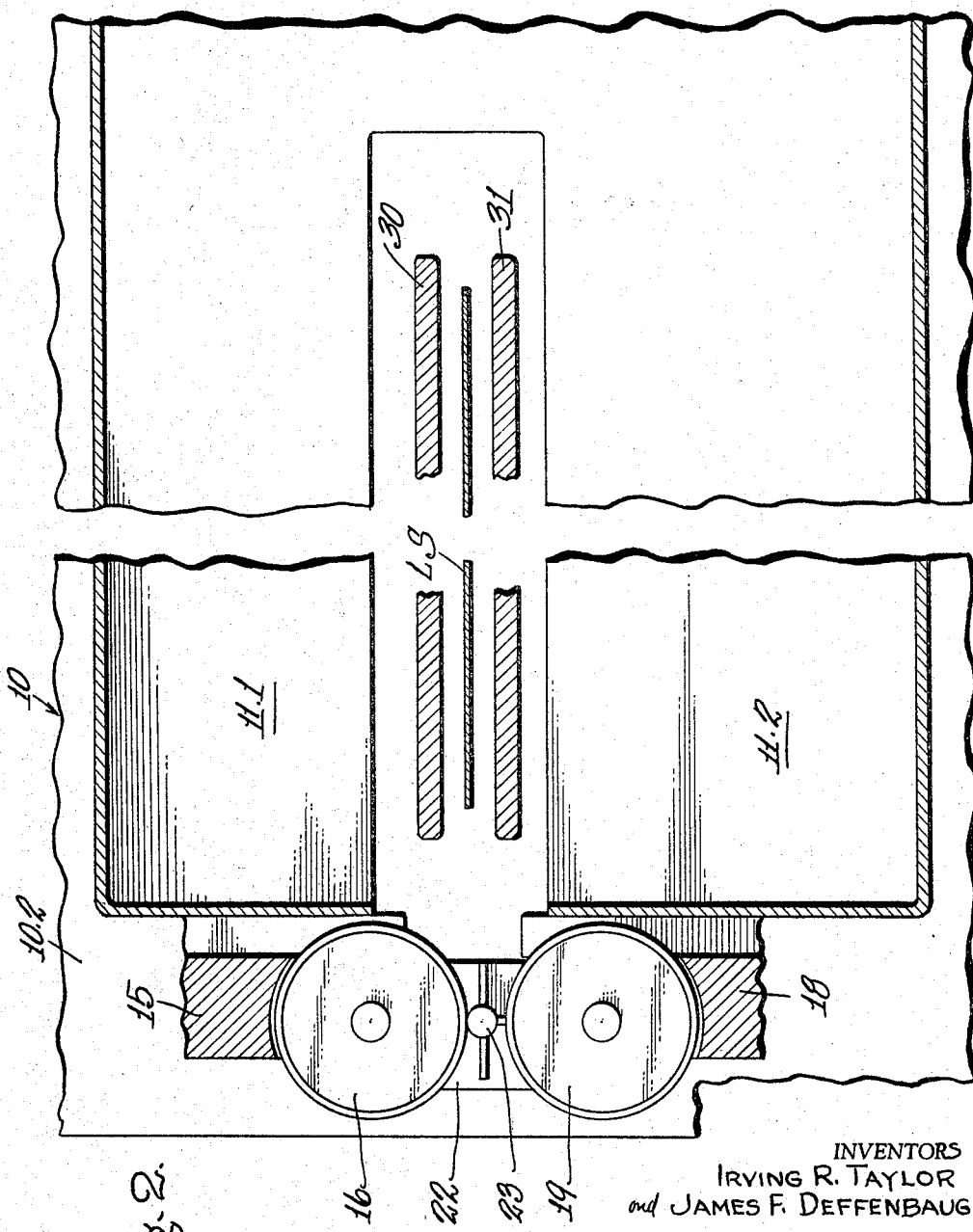

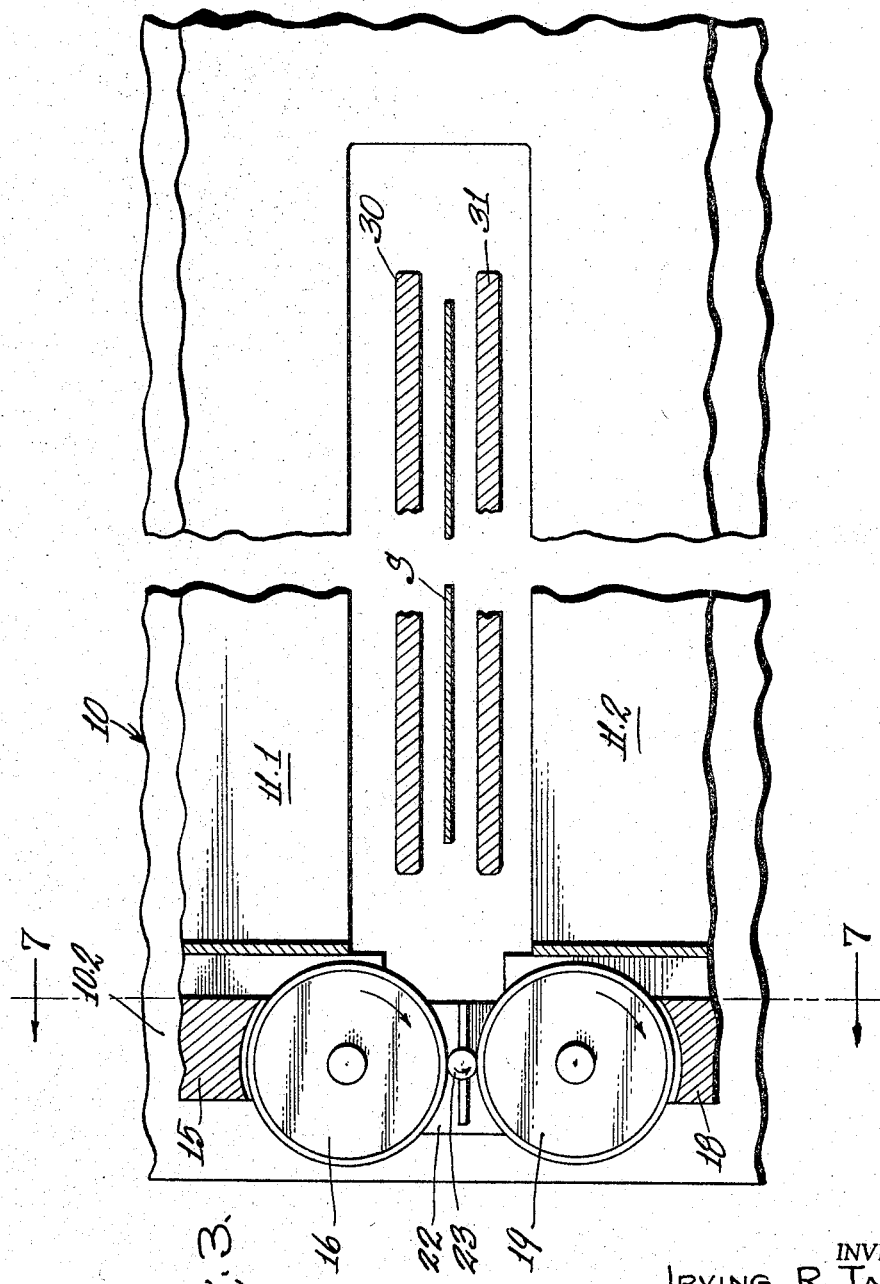

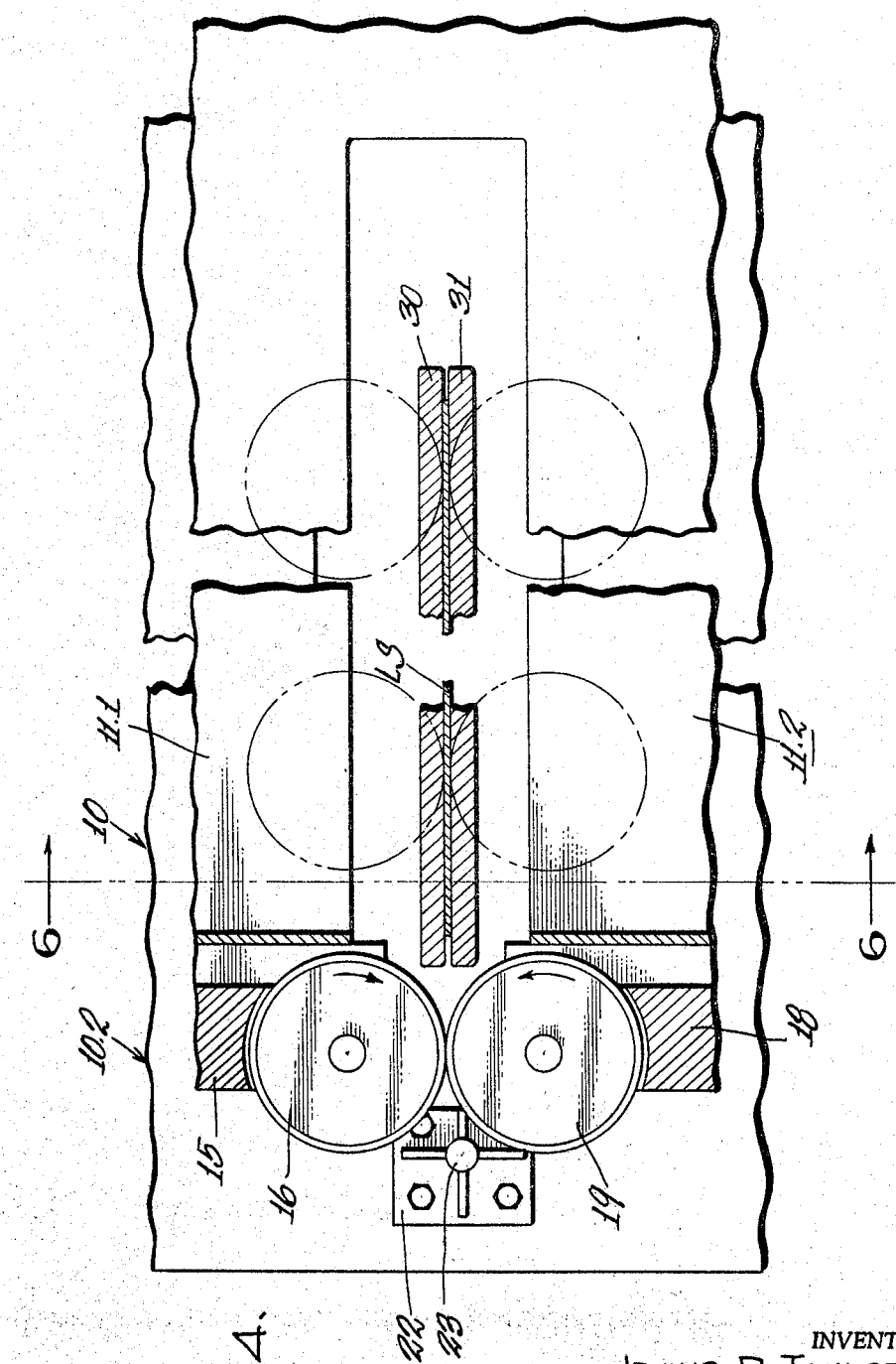

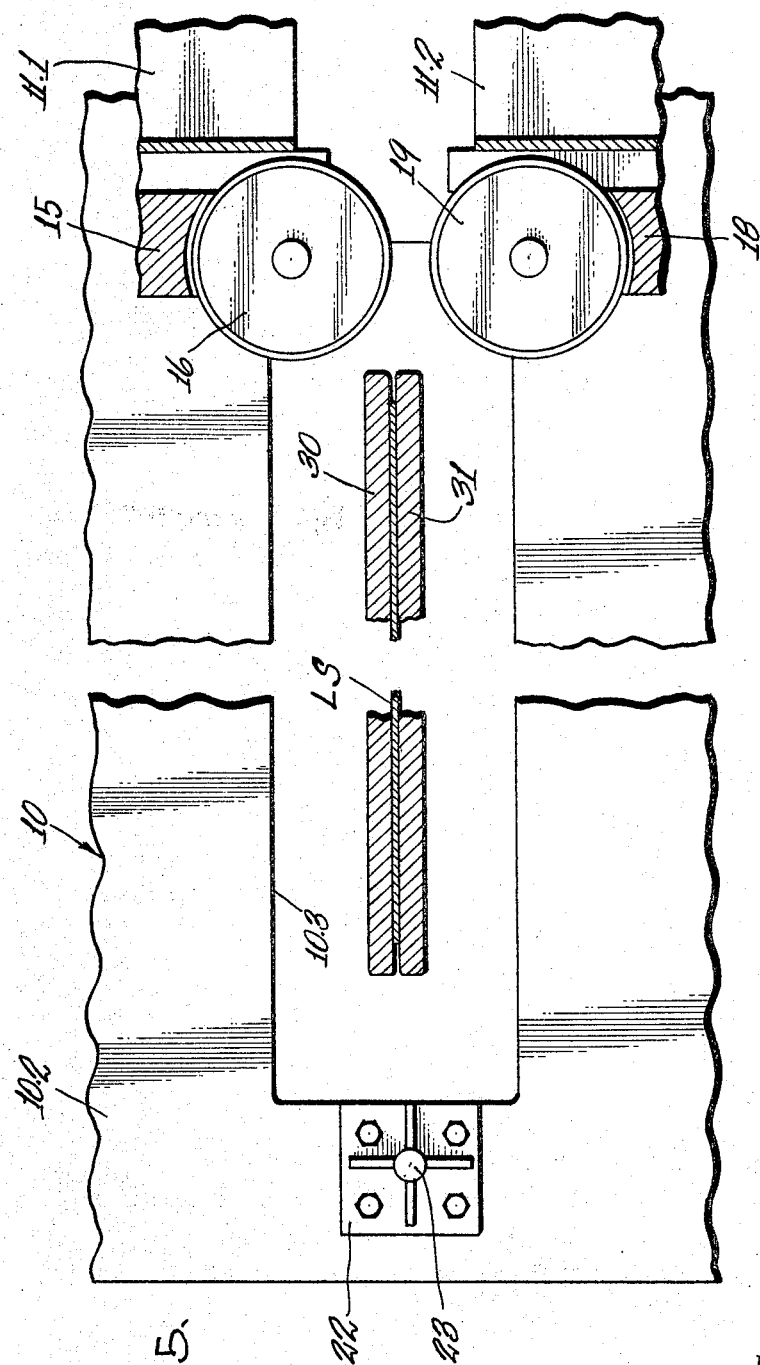

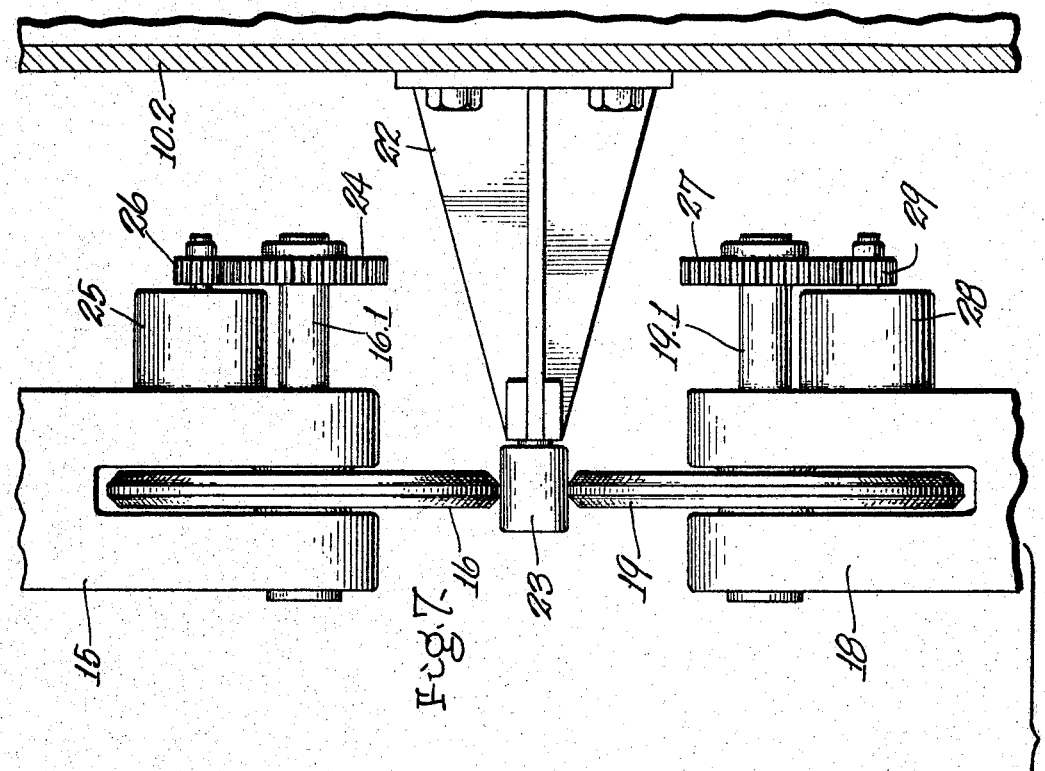
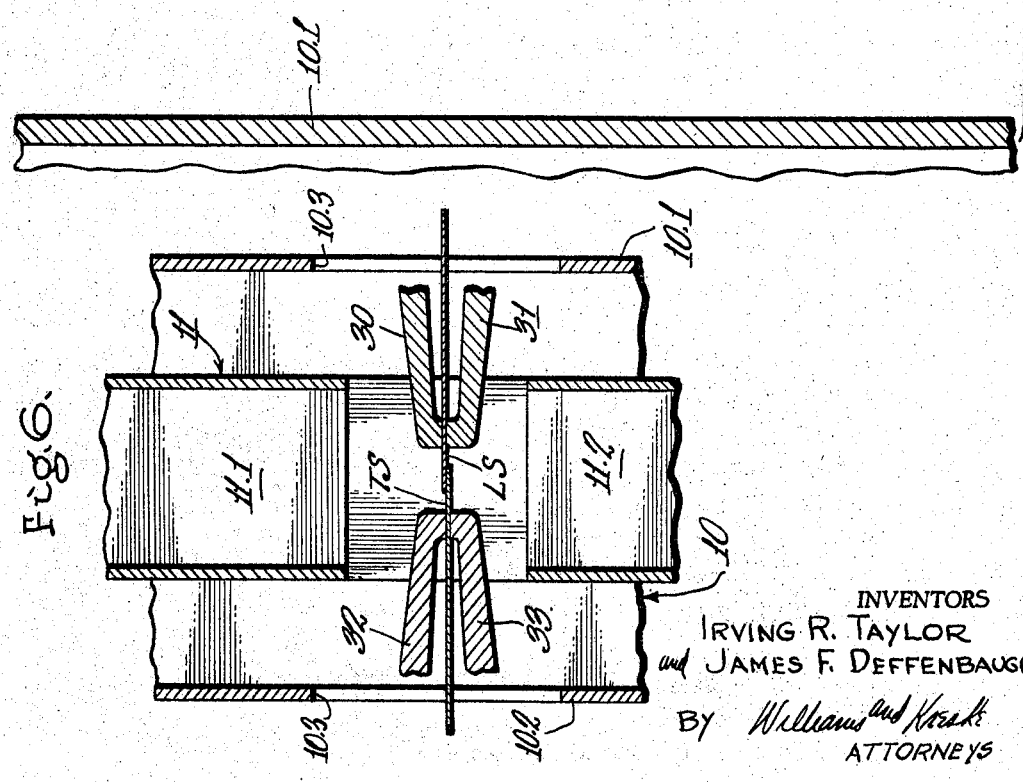

United States Patent Office

3,265,853
Patented August 9, 1966

3,265,853
METHODS OF AND APPARATUS FOR WELDING
Irving R. Taylor and James F. Deffenbaugh, Warren, Ohio, assignors to Federal-Warco Division of The McKay Machine Company, Warren, Ohio
Filed Apr. 10, 1963, Ser. No. 272,116
5 Claims. (Cl. 219—82)

The present invention relates to welding, more particularly to methods of and apparatus for welding metal strip ends together, and the principal object of the invention is to provide new and improved methods and apparatus of the character described.

In the application for Letters Patent of Arthur L. Williams and Irving R. Taylor, Serial No. 193,156, filed May 8, 1962, entitled Methods and Apparatus for Joining Strip Material, and assigned to the same assignee as the present case, there is disclosed a highly efficient strip joining apparatus and method. It has been found, however, that the prior invention is not entirely satisfactory for the welding of very thin strip material.

The present invention is therefore concerned with improvements to the application invention aforesaid to permit the satisfactory welding of strip as thin as one and one half thousands, even when such strip is galvanized or otherwise provided with a coating which intensifies an already difficult welding problem. The present solution to the problems of welding thin strip ends together will readily become apparent from study of the following description and from the drawings appended hereto.

In the drawings accompanying this specification and forming a part of this application there is shown, for purpose of illustration, an embodiment which the invention may assume, and in these drawings:

FIGURE 1 is a side elevational view of apparatus embodying the present invention, certain parts being removed in the interest of clarity, FIGURE 2 is an enlarged, fragmentary, broken view similar to FIGURE 1 but with even more parts on the near side removed to better illustrate the underlying structure, FIGURES 3, 4 and 5 are views similar to FIGURE 2 but showing certain parts at different stages of operation of the apparatus, FIGURE 6 is a fragmentary sectional view generally corresponding to the line 6—6 of FIGURE 4, FIGURE 7 is a fragmentary sectional view generally corresponding to the line 7—7 of FIGURE 3, FIGURE 8 is a schematic view showing control and operating circuits for the apparatus herein disclosed, and FIGURE 9 is a schematic view of another control circuit.

With reference first to FIGURES 1, 6 and 7, the apparatus chosen to illustrate the present invention comprises a base 10 formed of side members 10.1 and 10.2 having horizontally aligned openings 10.3 therein through which strip material S may travel through the apparatus when it is at rest. Slidably carried by the base 10 for horizontal movement between the base sides is a C-shaped carriage 11 having an upper arm 11.1 and a lower arm 11.2. Any suitable means may be provided for shifting carriage between its full and phantom line positions such as, for example, a reversible motor 12 driving a screw 13 having threaded engagement with a nut member 14 affixed to the carriage.

Carried by the free end of upper carriage arm 11.1 is a slide 15 rotatably supporting a roller electrode 16. Such slide is vertically adjustable by means of an adjustment screw and hand wheel assembly 17.

Similarly, the free end of lower carriage arm 11.2 carries a slide 18 rotatably supporting a roller electrode 19 in vertical alignment with the upper electrode 16. A fluid cylinder or the like 20 is carried by the lower carriage arm to effect shifting of slide 18 and its electrode 19 toward and away from electrode 16. Although not shown, the roller electrodes 16, 19 will preferably be electrically insulated in any suitable manner from the carriage 11 and will be suitably connected to the secondary circuit of a welding transformer 21 carried by the right-hand end of carriage 11.

For a purpose to appear and as best seen in FIGURES 5 and 7, a bracket 22 is secured to frame side wall 10.2 and rotatably support a roller 23 directly beneath and in engagement with the working face of electrode 16 when the carriage is positioned as shown in FIGURES 1 and 2. In the present embodiment, roller 23 has a hard, smooth periphery and is of constant diameter at least through that portion of its length which contacts the face of electrode 16.

With reference to FIGURE 7, means are provided for rotating electrodes 16, 19 and at the present time, electrode 16 has an axial shaft extension 16.1 to which is secured a gear 24. An air motor 25 is secured to the slide 15 and carries a gear 26 meshed with gear 24 whereby rotation of motor 25 effects rotation of the electrode 16. A similar arrangement is provided for electrode 19, the latter having an axial extension 19.1 carrying a gear 27. An air motor 28 is carried by the slide 18 and has a gear 29 meshed with the gear 27. As will later appear, suitable electromagnetic valves are employed to control flow of pressurized air to motors 25, 28.

Means are provided for clamping leading and trailing strip ends against movement during welding thereof and as best seen in FIGURE 6, upper and lower clamp arms 30, 31 are disposed on the right, or entry side of the apparatus while upper and lower clamp arms 32, 33 are disposed on the left, or exit side of the apparatus. Although not shown, the clamp arms aforesaid will be suitably carried by the base 10, respective upper and lower arms being relatively movable toward and away from each other to grip the interpositioned strip ends.

With the parts positioned as seen in FIGURES 1 and 2, it will be noted that the strip S may travel unimpeded from right to left from, for example, a strip pay-off reel (not shown) to, for example, a strip processing line (not shown) between which the present apparatus is adapted to be interposed. When the trailing end TS of the strip being fed from the pay-off reel reaches the present apparatus, clamp arms 32, 33 will be actuated to clamp such strip end as seen in FIGURE 6. A leading strip end LS will next be fed between the clamp arms 30, 31 and the latter actuated to also clamp such strip end. Although not shown in the interest of simplicity, the present apparatus may carry suitable shearing structure to transversely cut respective strip ends as disclosed in the previously mentioned application, the strip ends TS, LS preferably being clamped in overlapping relation as clearly illustrated in FIGURE 6.

With the strip ends clamped as above-described, carriage motor 12 will be actuated to shift carriage 11 to the right from the position seen in FIGURE 2 to the position seen in FIGURE 4. By means later to be disclosed, cylinder 20 will be actuated to elevate electrode 19 into forceable engagement with electrode 16 and motors 25, 28 will be actuated to cause rotation of the electrodes in opposite directions as indicated by the arrows. Continued movement of the carrige 11 to the right will cause the electrodes to roll across the strip ends along the line of overlap thereof, as indicated by the phantom lines, until the carriage reaches the position seen in FIGURE 5 wherein the electrodes have passed beyond the strip ends. At this time, rotation of electrodes 16, 19 may be terminated and cylinder 20 will once again lower the electrode 19.

It will be understood that as the electrodes 16, 19 roll across the overlapped strip ends, welding current will be fed from the transformer from one electrode to the other through the interposed strip ends. As a result of the heat generated by the passage of welding current through the strip ends and as a result of the pressure exerted on the strip ends by the cylinder 20 which urges the electrode 19 upwardly, the strip ends will be welded together.

It is an important feature of the present invention that the electrodes 16, 19 are driven by their respective motors at a peripheral speed approximating the speed of traverse of the carriage 11 in shifting the electrodes across the strip ends. Accordingly, as the electrodes are drawn across the strip ends, there is no tendency to wrinkle the latter despite their very light guage as sometimes occurs when the electrodes are merely allowed to rotate during carriage movement as a result of peripheral engagement of the electrodes with the strip ends. The function of rotating the electrodes is particularly important at the time when they first engage the strip ends during initial carriage movement.

With the strip ends TS, LS welded together and with the parts positioned as seen in FIGURE 5, the clamp arms 30, 31 and 32, 33 may be separated to once again permit unimpeded longitudinal strip movement. Carriage 11 will now be returned by motor 12 from the position seen in FIGURE 5 to the position seen in FIGURE 2. Upon return of carriage 11 to the position seen in FIGURE 2, cylinder 20 will elevate electrode 19 to engagement with the roller 23, as seen in FIGURE 3, and substantially simultaneously, one of the electrode motors, for example, motor 25 of electrode 16, will be actuated to rotate the latter in the direction of the arrow. Since both electrodes 16 and 19 are engaged with roller 23 at this time, rotation of roller 23 and electrode 19 will be effectuated in the directions indicated. After a relatively short period of time, rotation of electrode 16 will be terminated and electrode 19 will once again be lowered to the position seen in FIGURE 2 whereupon the apparatus is ready for another cycle of operation when two more strip ends are to be welded together.

It has been discovered that when welding together thin guage materials of the type herein disclosed, it is important that the working faces of the electrodes be as clean and as perfectly contoured as possible if consistently good welds are to be effectuated. For present purposes, it is essential that the electrode working faces be smooth and flat. It has been found that after making only one welding pass across the strip ends, the electrode faces become slightly distorted under the heat and pressure of the welding operation. Moreover, the electrodes tend to pick up small particles of metal or pieces of coating if the strip being welded is coated. This damage to the electrode faces, while slight, is sufficient to impair a subsequent welding operation on certain types of material.

For the above reasons, the electrodes 16, 19 are forceably rotated against the roller 23 intermediate each welding cycle, as previously described, to break off deposit accumulations and to smooth and true the electrode working faces but without removing any electrode material. This latter consideration; i.e., the non-removal of electrode material is very important since, as previously mentioned, the electrode working faces must be trued and smoothed intermediate each welding operation. Obviously, if prior art electrode maintaining devices (which remove electrode material) are used with the frequency herein required, the electrodes would soon be so reduced in size that early replacement would be necessary.

Turning now to FIGURE 8, there is disclosed power and control circuits for effecting certain of the previously described apparatus operations. As illustrated, a source of air pressure or the like is connected to the inlets of normally closed, solenoid-actuated fluid valves 34, 35 and 36. A conduit 37 connects the outlet of valve 34 with motors 25, 28, a throttling valve 38 being interposed in the conduit 37 adjacent the valve and a check valve 39 being interposed in such conduit intermediate the motors 25, 28 for a purpose to appear. A conduit 40 connects the outlet of valve 35 to the motor 25, while a conduit 41 connects the outlet of valve 36 to cylinder 20, a pressure reducing valve 42 being interposed in the conduit 41 to limit the force exerted by the cylinder 20.

The solenoid of valve 34 is connected to a power line L–1 by a conductor 43 in which are interposed the contacts 44.1 of a limit switch 44 whose actuator 44.5 is engaged by the carriage 11, as shown, when the latter is disposed in the position illustrated in FIGURES 1, 2 and 3. Also interposed in conductor 43 are the normally closed contacts 45.1 of a solenoid contactor 45. The other side of the solenoid of valve 34 is connected to a power line L–2 by a conductor 46.

The solenoid of valve 35 is connected to power line L–1 by a conductor 47 in which are interposed contacts 44.3 of limit switch 44 and the normally closed contacts 48.1 of a time-delay, solenoid contactor 48. The other side of the solenoid of valve 35 is connected to the power line L–2 by means of a conductor 49.

The solenoid of valve 36 is connected to power line L–1 by means of a conductor 50 in which are interposed the normally closed contacts 48.2 of time-delay contactor 48 and contacts 44.4 of limit switch 44. The other side of the solenoid of valve 36 is connected to power line L–2 by a conductor 51.

Intercepting conductor 50 intermediate contacts 48.2 and the solenoid of valve 36 is a branch conductor 52 which is connected to power line L–1 through contacts 44.2 of limit switch 44 and normally closed contacts 45.2 of the contactor 45.

The solenoid actuator of time-delay contactor 48 has one side connected to the power line L–2 by a conductor 53 and its other side connected to the conductor 47 intermediate the contacts 44.3, 48.1 by means of a conductor 54. The solenoid of contactor 45 is interposed in a conductor 55 which extends from power line L–2 and intercepts conductor 52 intermediate contacts 44.2, 45.2. Normally open contacts 45.3 of contactor 45 are interposed in conductor 55 intermediate power line L–2 and solenoid actuator 45.

Along with the limit switch 44 which is adapted to be operated by the carriage 11 when it is disposed in the position seen in FIGURES 1, 2 and 3 there is provided a limit switch 56 having an actuator 56.1 which is adapted to be engaged by the carriage 11 when it is disposed in the position seen in FIGURE 5. Switch 56 carries contacts 56.2 interposed in a conductor 57 which extends from power line L–2 to the conductor 55 intermediate the solenoid of contactor 45 and the contacts 45.3 thereof.

With the parts positioned as seen in FIGURE 2, carriage 11 is engaged with the actuator 44.5 of limit switch 44 thus opening the switch contacts 44.1, 44.2 and closing the switch contacts 44.3, 44.4. With contacts 44.3 closed, the solenoid of contactor 48 will be energized through conductors 53, 54, thus holding open the normally closed contactor contacts 48.1, 48.2. With the contacts 44.1, 44.2, 48.1 and 48.2 open, the solenoids of valves 34, 35 and 36 will be de-energized and thus no air will be fed to either the motors 25, 28 or the cylinder 20. Accordingly, neither electrode 16, 19 will be rotated nor will the latter be elevated.

Now, however, when carriage 11 is caused to move to the right from the position seen in FIGURE 2 to the position seen in full lines in FIGURE 4, the carriage will disengage from the switch actuator 44.5 thus closing the switch contacts 44.1, 44.2 and opening the switch contacts 44.3, 44.4. The opening of switch contacts 44.3 will de-energize the solenoid of contactor 48 thus allowing its contacts 48.1, 48.2 to close.

The closing of limit switch contacts 44.1 will energize the solenoid of valve 34 through closed contactor contacts 45.1 thereby causing air to flow to motors 25, 28 thus rotating respective electrodes 16, 19 in the directions seen in FIGURE 4. Throttling valve 38 is provided in conduit 37 to permit regulation of air flow to the motors 25, 28 so that the peripheral speed of the roller electrodes driven thereby will be more or less equal to the speed of traverse of the carriage.

The closing of limit switch contacts 44.2 will energize the solenoid of valve 36 through the closed contactor contacts 45.2 thereby causing air to flow to cylinder 20 thus elevating the lower electrode 19 to engagement with the upper electrode 16. Reducing valve 42 in conduit 41 permits ready control of the air pressure admitted to the cylinder to thus regulate the force exerted thereby.

Movement of carriage 11 to the right will continue until it reaches the position seen in FIGURE 5 wherein the carriage has engaged the actuator 56.1 of limit switch 56 thus closing contacts 56.2 thereof. If desired, switch 56 may also have contacts associated therewith (not shown) for reversing the direction of carriage movement to shift it from the position seen in FIGURE 5 to the position seen in FIGURE 2.

The closing of switch contacts 56.2 will energize the solenoid of contactor 45 through the closed switch contacts 44.2 and this will cause the contactor contacts 45.1, 45.2 to open and the contacts 45.3 to close. The closing of contacts 45.3 will maintain the solenoid of contactor 45 energized independently of switch contacts 56.2 for a reason to appear. The opening of contactor contacts 45.1 and 45.2 will respectively terminate operation of the electrode drive motors 25, 28 and lower the electrode 19 to the position seen in FIGURE 5.

Upon movement of carriage 11 to the left from the position seen in FIGURE 5, contacts 56.2 of limit switch 56 will open as soon as the carriage has disengaged from the switch actuator 56.1; however, the solenoid of contactor 45 will remain energized through the closed contacts 45.3 and thus electrode 19 will remain lowered and neither electrode will be rotated.

When carriage 11 returns to the position seen in FIGURE 2 and once again engages the limit switch actuator 44.5, switch contacts 44.1, 44.2 will re-open and contacts 44.3, 44.4 will re-close. The opening of switch contacts 44.2 will de-energize the solenoid of contactor 45 to thus close the contactor contacts 45.1, 45.2; however, since the switch contacts 44.1 and 44.2 are now open, no current will flow in the conductors 43, 52.

The closing of limit switch contacts 44.4 will energize the solenoid of valve 36 through the closed contactor contacts 48.2 to cause air to flow to cylinder 20 thus raising the lower electrode 19 to engagement with the roller 23 as seen in FIGURE 3. The closing of limit switch contacts 44.3 will energize the solenoid of valve 35 through the closed contactor contacts 48.1 thus causing air to flow to motor 25 to rotate the latter in a direction to cause relatively high-speed rotation of electrode 16 and consequent rotation of roller 23 and electrode 19 all as indicated in FIGURE 3. The closing of limit switch contacts 44.3 will also energize the solenoid of contactor 48; however, since this contactor if of the delay type, energization will have no immediate effect upon the normally closed, contactor contacts 48.1, 48.2.

After elapse of the delay period for which contactor 48 is designed, its contacts 48.1, 48.2 will open thus de-energizing the solenoids of valves 35, 36 to respectively terminate rotation of motor 25 and to lower the electrode 19 as seen in FIGURE 2. The apparatus is now at rest and remains ready for another cycle of welding operation as hereinbefore described.

As previously mentioned, novel means are provided for initiating flow of welding current between the electrodes 16, 19 and as best seen in FIGURE 9, welding transformer 21 may have its primary windings 21.1 connected across power lines L–1, L–2 by a conductor 58 in which are interposed the normally open contacts 59.1 of a solenoid actuated contactor 59. The secondary windings 21.2 of the transformer 21 are connected to electrodes 16, 19 by respective conductors 60, 61. One of the electrodes, for example, electrode 19, will be connected to power line L–1 by a conductor 62 while one of the strip clamp arms, for example, clamp arm 30, will be connected to the power line L–2 by a conductor 63 in which is interposed the previously mentioned solenoid of contactor 59.

In the position of parts shown in FIGURE 9, transformer 21 will remain de-energized until such time as electrode 19 has been shifted to engagement with the strip S clamped between the clamp arms 30, 31. Upon engagement of electrode 19 with the strip, current will flow in conductors 62, 63 via the electrode 19, the strip S and the clamp arm 30 to thus energize the solenoid of contactor 59. Energization of this contactor solenoid will close its contacts 59.1 in conductor 58 thus causing current to flow in the transformer primary 21.1 and inducing welding current in the transformer secondary 21.2. As the electrodes 16, 19 pass beyond the clamped strip, current flow through conductors 62, 63 will be terminated thus de-energizing contactor 59 and opening its contacts 59.1 to once again de-energize the welding transformer.

In view of the foregoing it will be apparent to those skilled in the art that we have accomplished at least the principal object of our invention and it will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim:

1. Apparatus for welding metal strip ends together, comprising means supporting the strip ends in overlapping relation, a carriage movable in a direction edgewise of said strip ends, a pair of roller electrodes carried by said carriage in opposed relation for gripping said strip ends therebetween and disposed at one side of said strip ends in one position of said carriage, means for passing welding current between said electrodes and through the interpositioned strip ends for welding the latter together, means for moving said carriage from said one position to cause said electrodes to traverse the strip ends from edge-to-edge thereof along the line of strip end juncture and for returning said carriage to said one position, a roller positioned at said strip ends on said one side and positioned intermediate said electrodes when said carriage is disposed in said one position and having a working face complementary to the desired working faces of said electrodes, means for effecting relative movement of said electrodes toward each other to selectively grip said roller and said strip ends therebetween, means responsive to return of said carriage to said one position following a welding operation for moving said electrodes to gripping engagement with said roller and for rotating said electrodes in one direction and said roller in the opposite direction to restore the working faces of said electrodes to the desired contour, and means responsive to movement of said carriage away from said one position for rotating said electrodes in opposite directions for rolling along said strip ends and at a peripheral speed generally corresponding to the speed of movement of said carriage.

2. Welding apparatus, comprising a welding transformer having its primary winding electrically connected across a pair of power lines, a pair of roller electrodes in opposed relation to form a pass for work to be welded and being movable toward each other to engage opposite sides of said work, said electrodes being electrically connected to respective opposite sides of the secondary winding of said transformer and one of said electrodes being electrically connected to one of said power lines, clamp means for holding the work in predetermined position during the welding operation, conductor means electrically connecting said clamp means to the other of said power lines, switch means interposed in the electrical connection of said primary windings with said power lines to control flow of electrical current from said lines to said primary windings, and actuator means operable when current is flowing in said conductor means to close said switch and provide for flow of current to said primary windings, the engagement of said one of said roller electrodes with the work clamped between said clamp means providing for flow of current in said conductor means.

3. Apparatus for welding metal strip ends together, comprising means supporting the strip ends in overlapped relation, a carriage movable in a direction edgewise of said strip ends, a pair of roller electrodes carried by said carriage in opposed relation for engaging the overlapped strip ends therebetween and disposed at one side of said strip ends in one position of said carriage, means for passing welding current between said roller electrodes and through the interposed strip ends for welding the latter together, means for moving said carriage from said one position to cause said electrodes to traverse the strip ends from edge-to-edge and for returning said carriage to rest in said one position, a roller positioned at said strip ends on said one side and positioned intermediate and in operative alignment with said electrodes when said carriage is disposed in said one position and having a working face complementary to the desired working faces of said electrodes, means for effecting relative movement of said electrodes toward each other to selectively grip said roller and said strip ends therebetween, and means for rotating said electrodes and said roller with the latter gripped therebetween to maintain the desired contour of said working faces.

4. The construction of claim 3 and including means for relatively moving said electrodes toward each other to grip said roller therebetween each time said carriage returns to said one position following a welding operation.

5. The construction of claim 3 wherein said rotating means causes rotation of said electrodes in the same direction with said roller gripped therebetween and causes rotation of said electrodes in opposite directions with said strip ends gripped therebetween.

References Cited by the Examiner
UNITED STATES PATENTS

| | | | |
|---|---|---|---|
| 2,284,403 | 5/1942 | Marquart | 219—82 |
| 2,412,069 | 12/1946 | Trinks | 219—81 |
| 2,467,027 | 4/1949 | Glandis | 219—84 |
| 2,467,091 | 4/1949 | O'Neil | 219—84 |
| 2,486,592 | 11/1949 | Forssmark et al. | 219—81 |
| 2,631,478 | 3/1953 | Van Sciver | 219—84 |
| 2,634,353 | 4/1953 | Geiszler et al. | 219—82 |
| 2,663,784 | 12/1953 | Iversen | 219—83 |
| 2,957,975 | 10/1960 | Pearson | 219—81 |
| 3,119,005 | 1/1964 | Riley et al. | 219—82 |

RICHARD M. WOOD, *Primary Examiner.*

B. A. STEIN, *Assistant Examiner.*